Figure 1:
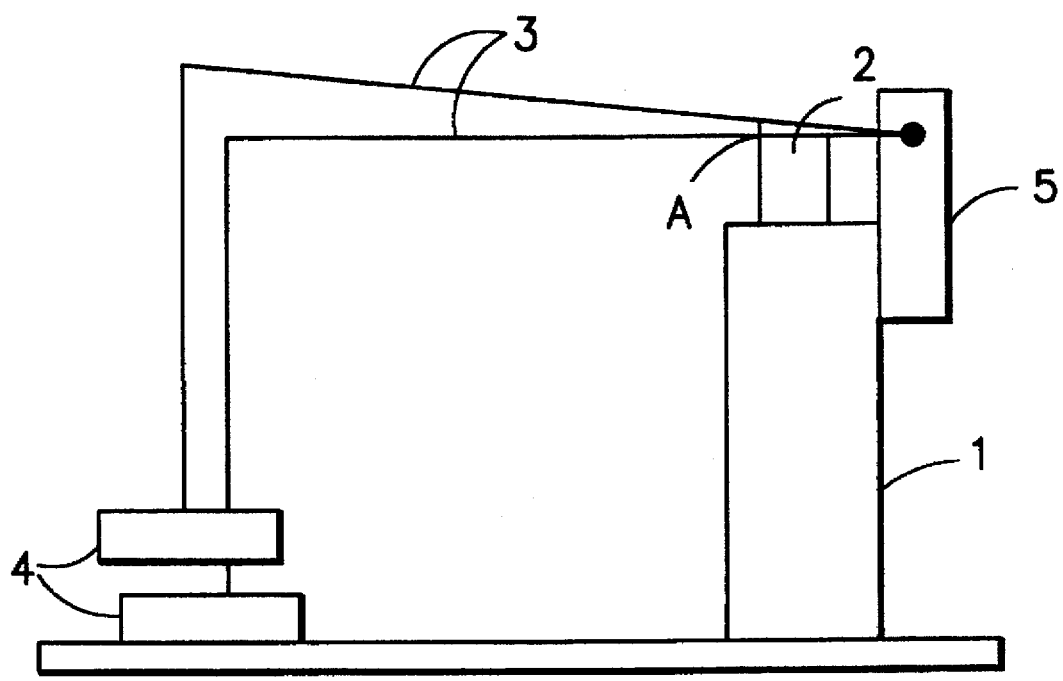

United States Patent [19]
Leicht

[11] Patent Number: 5,702,051
[45] Date of Patent: Dec. 30, 1997

[54] DEVICE FOR MOVING AN OBJECT BY MEANS OF THERMAL CHANGE IN SHAPE OR VOLUME

[76] Inventor: Helmut Walter Leicht, Messerschmittring 61, D-86343 Königsbrunn bei Augsburg, Germany

[21] Appl. No.: 640,758

[22] PCT Filed: Nov. 7, 1994

[86] PCT No.: PCT/EP94/03645

§ 371 Date: May 30, 1996

§ 102(e) Date: May 30, 1996

[87] PCT Pub. No.: WO95/13161

PCT Pub. Date: May 18, 1995

[30] Foreign Application Priority Data

Nov. 8, 1993 [DE] Germany .......................... 43 38 094.8

[51] Int. Cl.$^6$ .......................... B23K 1/015; B23K 1/018; B23K 3/00

[52] U.S. Cl. .......................... 228/234.2; 228/264; 228/13; 228/49.5

[58] Field of Search .......................... 228/264, 119, 228/191, 44.7, 234.2, 13, 49.5; 74/103, 110; 60/520, 525, 527, 530

[56] References Cited

U.S. PATENT DOCUMENTS

| | | | |
|---|---|---|---|
| Re. 22,206 | 10/1942 | Parsons | 74/110 |
| 1,036,484 | 8/1912 | Glass et al. | 74/110 |
| 3,721,125 | 3/1973 | Kugler et al. | 60/527 |
| 3,721,421 | 3/1973 | Cliff | 60/530 |
| 3,842,478 | 10/1974 | Schreckeneder | 29/764 |

FOREIGN PATENT DOCUMENTS

| | | |
|---|---|---|
| 2200730 | 4/1974 | France . |
| 7243582 | 3/1973 | Germany . |
| C2409977 | 9/1974 | Germany . |
| A2548990 | 11/1976 | Germany . |
| A3532944 | 3/1987 | Germany . |
| A3544128 | 6/1987 | Germany . |

OTHER PUBLICATIONS

IBM Technical Disclosure Bulletin, "Memory Wire Chip Removal Fixture", vol. x2, No. 10A, p. 195, Mar. 1990.
IBM Technical Disclosure Bulletin, "Interposer Remove Tool", vol. 35, No. 4A, pp. 25–27, Sep. 1992.
"ERSA EAS 1000, Leistungsstarkes Auslötsystem für integrierte Schaltkreise", Wertheim, Nov. 1987.

*Primary Examiner*—Samuel M. Heinrich
*Attorney, Agent, or Firm*—George W. Rauchfuss, Jr.

[57] ABSTRACT

The invention provides a device for moving an object by means of thermal change in shape or volume, such that the object is moved when a predetermined process temperature has been reached. Preferably the device can be used in a soldering system on a printed circuit board. The advantage of the invention lies in a temperature-controlled movement of the object with a high-level precision that, for example, ensures a very sparing unsoldering.

12 Claims, 1 Drawing Sheet

DEVICE FOR MOVING AN OBJECT BY MEANS OF THERMAL CHANGE IN SHAPE OR VOLUME

The present invention relates to a device (manipulator) for moving an object by means of thermal change in shape or volume, such that the object is moved when a predetermined process temperature has been reached. Especially in heating furnaces a manipulator system is needed which allows moving a body towards or away from another body when a predetermined temperature has been reached. Usually, complicated devices are necessary to ensure a safe handling of the bodies, particularly in the case of higher temperatures.

An example of this are soldered joints in the field of electronics. Due to the present-day miniaturization of the components and the sensitivity of materials for printed circuit boards, it becomes more and more difficult to unsolder defective or wrongly inserted components from a printed circuit board. There is always a risk of damaging the printed circuit board or the component.

When repairing components, more or less complicated devices are used whose quality is often poor. This involves high costs and damage to circuit modules is inevitable. In the prior art, the following repair soldering methods are generally used:

hand-held unsoldering irons, unsoldering irons using hot air, hot-air repair soldering stations with various nozzle inserts, bar unsoldering, infrared unsoldering, and vapor-phase unsoldering.

The vapor-phase unsoldering has considerable advantages. However, this method also requires relatively complicated devices for lifting off the components. The main problem is the time of the unsoldering. In order to prevent both the conductor lines and the component from being damaged, the pulling force must only act on the component after the solder is molten.

Irrespective of the unsoldering method selected, there is always the problem that the solder must be molten at all joints between the component and the printed circuit board in order to prevent damage to the conductor lines or to the component.

There is no system which is, one the one hand, capable of entering and passing through the heating furnace and, on the other hand, removes the component automatically only when the solder is molten.

The object to be achieved by the invention is to provide a device which can particularly be used for unsoldering electronic components, which is easy to handle, works reliably and does not cause damage to the circuit module or the component. Preferably, the device should be so small that it can for instance be directly placed on a printed circuit board, connected with a component to be unsoldered and removes the component from the printed circuit board when a predetermined temperature has been reached.

This object is achieved with the features of the claims.

The solution of the invention is based on the concept to provide a device in which a temperature-dependent change in shape or volume occurs and which is connected with an object to be moved, for instance a component on a printed circuit board. When a predetermined temperature has been reached, the change in shape or volume causes the object to move. The device can consist of a bimetal, a metal having a shape memory effect, bellows or a piston-equipped cylinder filled with a fluid (liquid and/or gas) or solid bodies which expand when the temperature increases.

The advantage of the invention lies in a temperature-controlled movement of an object with a high-level precision which is solely caused by the process temperature inside the heat treatment means without any additional action from the outside.

In the following, the invention is described in more detail with reference to the single drawing.

FIG. 1 shows a basic illustration of an embodiment according to the invention.

FIG. 1 shows an embodiment according to the invention wherein the change in volume of a fluid or solid body is used in a cylinder which is sealed by a piston 2 movable in said cylinder. Rods 3 are hinged in a holding device 5 at the cylinder 1, rest on the piston 2 and are connected with an object 4. Due to the change in volume of the interior of the cylinder when a predetermined temperature has been reached, the piston 2 moves upwards from an initial position A together with the rods 3. Due to this, the object 4 (e.g. a component) is lifted off a base (e.g. a printed circuit board). According to the desired change in volume and the working temperature, different media can be used for the increase in volume. If a high stroke is desired which only occurs at a specific temperature, for instance a liquid with a boiling point of e.g. 190° C. may be selected. Only when the boiling temperature has been reached will, depending on the amount of liquid, a considerable change in volume take place which produces high pressure. Due to this, the piston is transferred into its upper dead center by means of the vapor pressure. When the temperature falls below the boiling point, the piston is moved back into its starting position due to the resulting low pressure. Since the low pressure alone is usually not sufficient for moving the piston back into its starting position, this movement may be aided by external forces (springs or weight). The change in shape (bimetal, metal capable of change in shape) or the change in volume in a cylinder or bellows can also directly act on an object and move said object without an intermediate (e.g. rods).

When using this method in vapor-phase soldering, the device is for instance placed on a printed circuit board to be repaired and a manipulator arm (rods) 3 is connected with a component to be unsoldered. The printed circuit board enters the vapor-phase. In the vapor-phase, the printed circuit board is first heated and the solder of the component joint melts (e.g. Sn63Pb37 at 183° C.). After the device (manipulator) has been heated to 190° C., the cylinder is moved into its upper dead center by the change in volume and the component is removed perfectly gently and reliably. After cooling the circuit module, the component clings to the manipulator and can even be used again.

The device according to the invention may be used in any desired heat transfer chambers. The materials for the thermal change in shape or volume must then be selected in such a way that a movement is achieved at a specific temperature.

The invention is preferably used in an unsoldering process. However, it may also be used as a temperature-controlled switch, as a unit in a transport system or as a temperature-controlled metering apparatus.

In case of a metering apparatus, the device may be connected with a lid which is opened or closed depending on the temperature.

The device may also be connected with a sealing material causing a temperature-controlled seal.

I claim:

1. A device for moving an electronic component on a circuit board by a process temperature during unsoldering or soldering in the vapor-phase by means of thermal change in shape or volume when a predetermined process temperature at or above the melting point of the solder has been reached, comprising a closed container (1) filled with a fluid or a solid body, a free end (2) of the container or solid body is connected with the electronic component, wherein the volume of the fluid or solid body is increased under the influence of the predetermined process temperature, so that the free end (2) of the container (1) or solid body is pushed from a starting position (A) and the electronic component is moved relative to the printed circuit board.

2. The device according to claim 1, characterized in that the container (1) constitutes bellows.

3. The device according to claim 1, characterized in that
   (a) the container is a cylinder (1) in which a piston (2) is movable, and
   (b) the piston acts upon rods (3) which are connected with the electronic component.

4. The device according to claim 3, characterized in that the rods (3) are hinged at the cylinder (1) in a holding device (5).

5. The device according to claim 3 characterized in that the piston (2) is movable against a force which moves the piston (2) back into the starting position (A) when the volume of the fluid is reduced.

6. A process for moving an electronic component on a printed circuit board solely by a process temperature during unsoldering or soldering by means of a thermal change in shape or volume when a predetermined process temperature at or above the melting point of the solder has been reached, said process comprising:

providing a closed container (1) filled with a fluid or a solid body, a free end (2) of the container or solid body being connected at a starting position (A) with the electronic component (4), and increasing the volume of the fluid in the container or the shape of the solid body by said process temperature whereby said free end of the container or solid body is pushed from the staring position and the electronic component is thereby moved relative to the printed circuit board when the predetermined process temperature has been reached.

7. The process according to claim 6 wherein the process comprises moving an electronic component from a printed circuit board during vapor-phase unsoldering of the electronic component from the printed circuit board.

8. The process according to claim 7 wherein the container (1) filled with a fluid is provided and the container is a cylinder in which a piston (2) having said free end is moved by the increase in volume of the fluid and the free end of the piston acts upon a rod (3) connected to the electronic component to provide said movement of the electronic component when the predetermined process temperature is reached.

9. The process according to claim 8 wherein the rod is hinged at the cylinder by a holding device (5).

10. The process according to claim 9 comprising the additional step of providing a force against which the piston is movable which returns the piston back to the starting position (A) when the volume of fluid is reduced by a reduction in the process temperature.

11. The process according to claim 8 wherein the predetermined process temperature is a temperature at or above the boiling point of the fluid in the container.

12. The process according to claim 6 wherein the container (1) filled with fluid is provided and comprises bellows.

* * * * *